(12) United States Patent
Foxlin et al.

(10) Patent No.: US 6,314,055 B1
(45) Date of Patent: Nov. 6, 2001

(54) RANGE MEASURING SYSTEM

(75) Inventors: Eric Foxlin, Arlington; Russell L. Moore, Hudson, both of MA (US)

(73) Assignee: Intersense, Inc., Burlington, MA (US)

( * ) Notice: Subject to any disclaimer, the term of this patent is extended or adjusted under 35 U.S.C. 154(b) by 0 days.

(21) Appl. No.: 09/173,967

(22) Filed: Oct. 16, 1998

(51) Int. Cl.$^7$ .............................. G01S 3/80; G01S 15/00

(52) U.S. Cl. ............................................ 367/127; 73/597

(58) Field of Search ..................... 367/99, 127; 73/597, 73/861.27

(56) References Cited

U.S. PATENT DOCUMENTS

| | | | |
|---|---|---|---|
| 3,566,348 | 2/1971 | Leyden et al. | 340/16 |
| 3,824,464 | 7/1974 | Rotier et al. | 324/186 |
| 4,022,058 | 5/1977 | Brown | 73/194 |
| 4,054,862 | 10/1977 | Backman, Jr. | 340/3 |
| 4,176,337 | 11/1979 | Aechter et al. | 367/131 |
| 4,334,431 | 6/1982 | Kohno et al. | 73/597 |
| 4,480,485 | 11/1984 | Bradshaw et al. | 73/861 |
| 4,572,917 | 6/1988 | Dechape | 367/125 |
| 4,933,915 | 6/1990 | Boström | 367/99 |

(List continued on next page.)

OTHER PUBLICATIONS

Tong et al., "Hardware Method For Accurate Measurements In A Transmit–Receive Ultrasonic Ranging System".

Figueroa et al., "A Method For Accurate Detection Of Time Arrival: Analysis and Design Of An Ultrasonic Ranging System", J.Acoust.Soc. Am. 91(1), Jan. 1992.

Sabatini, "A Digital Signal–Processing Technique for Compensating Ultrasonic Sensors", IEEE Transactions on Instrumentation, vol. 44, No. 4, Aug. 1995.

Foxlin et al., "Constellation™: A Wide–Range Wireless Motion–Tracking System For Augmented Reality and Virtual Set Applications", Computer Graphics Proceedings, Annual Conference Series, 1998.

InterSense Eric Foxlin Letter dated Dec. 17, 1998 with pp. 36 through 38, 47 through 48 and 147 through 148 of Lipman Electronic Engineering Ltd Owner's Guide VS–100/V–scope™ System, Copyright 1990, Israel, attached.

Pegasus Technologies Ltd., Tel Aviv, Isreal, "3D Mouse Developer's Kit".

Lamancusa, "Ranging errors caused by angular misalignment between ultrasonic transducer pairs", J. Acoust. Soc. Am., 87(3):1327–1335, Mar. 1990.

*Primary Examiner*—Ian J. Lobo
(74) *Attorney, Agent, or Firm*—Fish & Richardson P.C.

(57) ABSTRACT

A system is provided for determining range to a wave energy source. The system includes a transmitter for transmitting a burst of pulses of wave energy in response to a trigger signal. A receiver is provided for determining a time of arrival of the burst and from such determined time of arrival, the range to the wave energy source. The receiver includes: an envelope detector for detecting an envelope of the burst; a network for producing an output in response to an early point on the detected envelope occurring prior to a peak in the detected envelope; a timer, responsive to the trigger signal and the network output for determining the time of arrival of the burst; and a processor, responsive to such determined time of arrival, for determining the range of the wave energy source from the transmitter. The receiver includes a differentiator network for producing an output in response to the nth derivative of the detected envelope, where n is an integer greater than one; and, the timer is responsive to the trigger signal and the differentiator output for determining the time of arrival of the burst. The receiver also includes a means for confirming detection of a valid burst after the detection of the early point and a means to transmit and wherein the previously recorded time of arrival point only if it is followed by a valid burst confirmation.

16 Claims, 7 Drawing Sheets

U.S. PATENT DOCUMENTS

| | | | |
|---|---|---|---|
| 5,031,159 | 7/1991 | Rouquette | 367/125 |
| 5,043,950 | 8/1991 | Schorum et al. | 367/98 |
| 5,046,053 | 9/1991 | Gilchrist | 367/98 |
| 5,124,952 | 6/1992 | Knize et al. | 367/34 |
| 5,142,506 | 8/1992 | Edwards | 367/127 |
| 5,148,178 | 9/1992 | Holzer et al. | 342/127 |
| 5,159,343 | 10/1992 | Harmuth | 342/22 |
| 5,168,762 | 12/1992 | Gill | 73/861.28 |
| 5,178,018 | 1/1993 | Gill | 73/861.28 |
| 5,247,489 | 9/1993 | Pirie | 367/127 |
| 5,260,910 | 11/1993 | Panton | 367/99 |
| 5,280,457 | 1/1994 | Figueroa et al. | 367/127 |
| 5,302,957 | 4/1994 | Franzen | 342/125 |
| 5,550,549 | 8/1996 | Procter, Jr. et al. | 342/47 |
| 5,645,077 | 6/1997 | Foxlin | 128/774 |
| 5,705,750 * | 1/1998 | Mizukami et al. | 73/597 |
| 5,793,704 | 8/1998 | Freger | 367/95 |
| 5,812,257 | 9/1998 | Teitel et al. | 128/774 |

\* cited by examiner

RANGE MEASURING SYSTEM

BACKGROUND OF THE INVENTION

This invention relates generally to range measuring systems and more particularly to range measuring systems wherein range is determined by measuring the time of arrival of wave energy.

As is known in the art, range measuring systems have a wide range of applications. One such system includes a transmitter for transmitting a pulse of wave energy, such as a radar or sonar pulse, directing such pulse towards an object, detecting a reflection by the object of such pulse, measuring the time of arrival of the detected reflection, and determining the range to the object from such measured time of arrival. In this case, called pulse-echo mode, the range is calculated as half the roundtrip travel time, times the speed of propagation. In other systems called transmit-receive mode, the range to the actual source of the wave energy itself is detected. One such system is described in U.S. Pat. No. 5,280,457, issued Jan. 18, 1994, and entitled Position Detection System and Method. Such U.S. Patent describes the use of a peak detector to detect the peak of the wave energy and from the detected peak, the time of arrival of the wave energy. In such system, the peak of the wave energy is determined using a differentiator circuit. Another system is described in U.S. Pat. No. 5,142,506, issued Aug. 25, 1992 and entitled Ultrasonic Position Locating Method and Apparatus Therefor.

SUMMARY OF THE INVENTION

In accordance with the invention, a system is provided for determining a time of arrival of a waveform having a predetermined shape. The waveform has a rising amplitude portion and terminating portion. The waveform may be attenuated as such waveform passes through a medium while such medium maintains the predetermined shape of the waveform, except for a scale factor representing the attenuation. The system includes a detector for detecting a predetermined time rate of change characteristic of the waveform envelope during the rising portion of such waveform. A processor is typically provided for determining the time of arrival of the waveform in response to the detected predetermined time rate of change characteristic of the waveform.

With such system, reception of the waveform is detected before any reflection from an echo reflecting surface interferes with, and thereby distorts, the characteristics of the waveform around the peak of the envelope or trailing portion of such received waveform. Thus, the system provides more accurate detection of the received waveform compared with a system which relies solely on detection of the peak of the envelope of such received waveform.

In accordance with another feature of the invention, a method is provided for detecting a waveform having a predetermined shape. The waveform includes a rising portion and terminating portion, such waveform having been attenuated as such waveform passes through a medium while the medium maintains the predetermined shape of the waveform. The method includes detecting a predetermined time rate of change characteristic of the waveform during the rising portion of such waveform.

In accordance with another feature of the invention, a system is provided for determining range to a source of wave energy. The system includes a transmitter for transmitting a burst of wave energy in response to a trigger signal. A receiver is provided for determining a time of arrival of such energy, and from such determined time of arrival, the range to the source. The receiver includes: an envelope detector for detecting an envelope of the burst; a network for producing an output in response to a detection point on the detected envelope occurring prior to a peak in the detected envelope; a timer, responsive to the trigger signal and the network output for determining the time of flight of the burst; and, a processor for calculating from the determined time of flight the range travelled by the transmitted wave energy. The temporal location of the detection point is unaffected by attenuation of the burst waveform.

In accordance with another feature of the invention, the receiver includes: an envelope detector for detecting an envelope of the burst; and, a differentiator network for producing an output in response to the first peak of the nth derivative of the detected envelope, where n is an integer greater than zero.

In accordance with another feature of the invention, the receiver includes a valid burst detector for confirming the reception of the burst and wherein the exact time of arrival measured by the network prior to the burst confirmation is not transmitted until after the reception of a valid burst has been confirmed, in order to reduce false alarms.

BRIEF DESCRIPTION OF THE DRAWING

Other features of the invention, as well as the invention itself, will become more readily apparent from the following detailed description when taken together with the accompanying drawings, in which.

DESCRIPTION OF THE PREFERRED EMBODIMENTS

Figure 1:
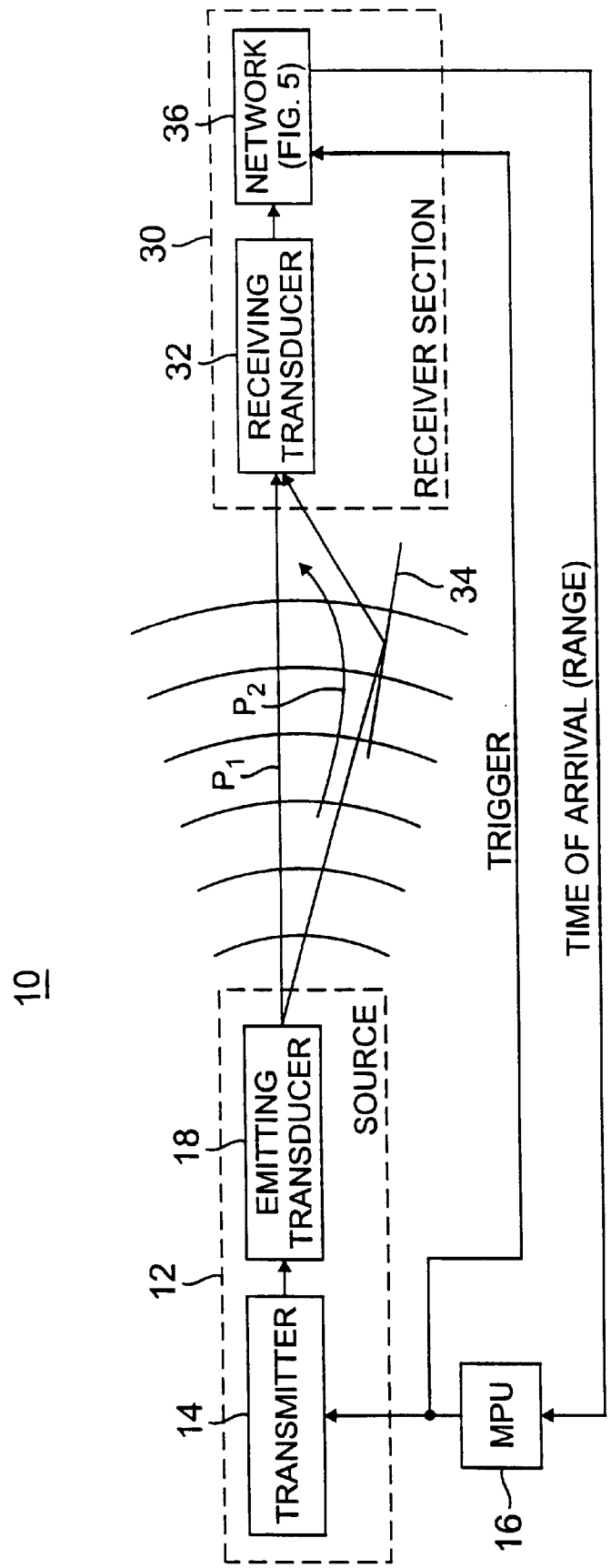
FIG. 1 is a block diagram of a range measuring system according to the invention.
Figure 2A:
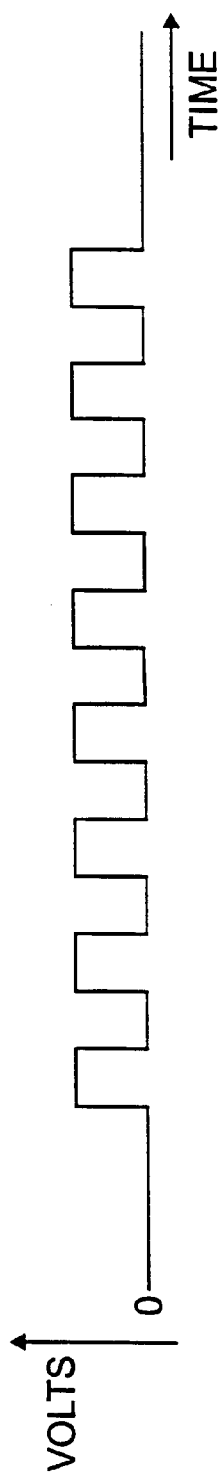
FIG. 2A is a waveform used to drive a wave form energy transducer in the system of FIG. 1.
Figure 2B:
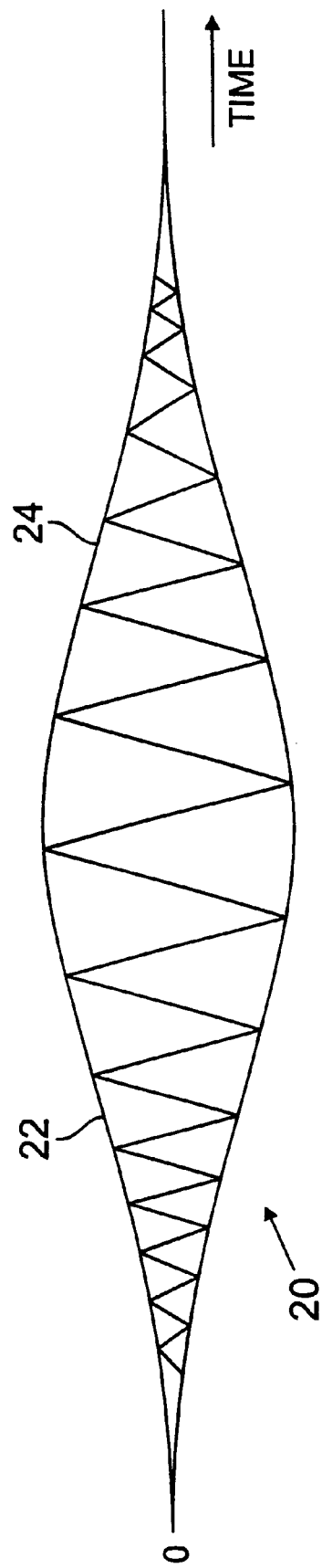
FIG. 2B is a waveform produced by the transducer driven by the waveform of FIG. 2A.

Referring now to FIG. 1, a system 10 is shown for determining range from a source 12 of wave energy to a receiver 30. The range measurement may correspond to a direct path between a spatially separated source and receiver or to half of the roundtrip path length from a source transducer to a reflective object and back to a spatially coincident receiving transducer. The source 12 includes a transmitter 14 for transmitting a burst of sound wave energy in response to a trigger signal. Here, the trigger pulse is generated by a computer or microprocessor processing unit (MPU) 16. In response to the trigger signal, a burst of signal, here a train of electrical pulses, is generated and used to drive emitting transducer 18, in this case an ultrasonic speaker. The speaker 18 may be mounted on an object, not shown, being tracked for example. Here, the burst of electrical pulses fed to the speaker 18 is a train of eight pulses, such pulses having a pulse repetition frequency of 40 KHz, as shown in FIG. 2A. Thus, here the burst is 0.2 milliseconds in duration. In response to this burst of pulses, the speaker 18 produces a corresponding burst of ultrasonic wave energy having a frequency of here 40 KHz. The waveform, (i.e., the burst 20 of sound energy), produced by the speaker 18 is shown in FIG. 2B. It is noted that the envelope of the burst 20 increases from a zero level monotonically during a leading edge portion 22 to a maximum level, or peak, after about 0.2 milliseconds, and then decreases back to zero during a trailing edge portion 24 of the burst 20 of sound to the zero level.

Figure 3:
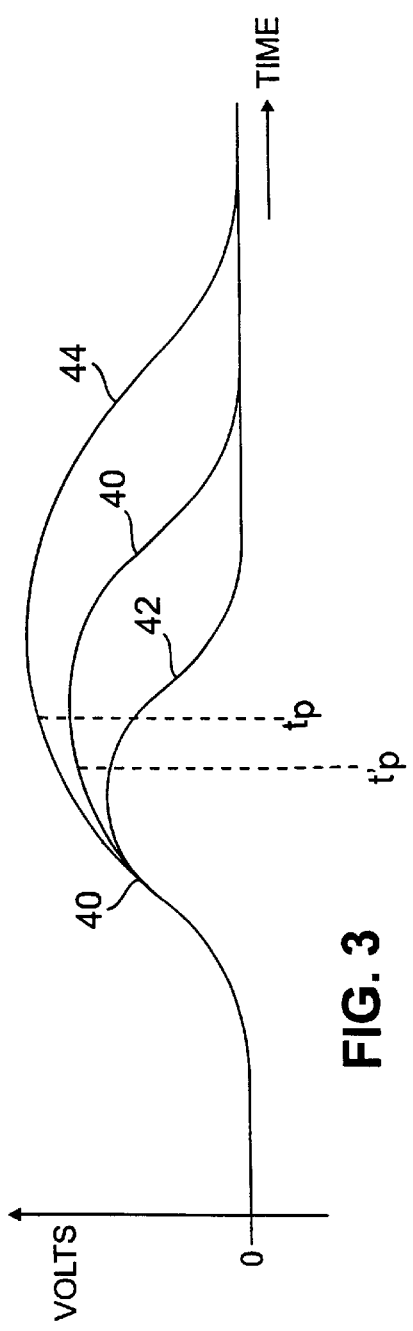
FIG. 3 is a set of waveform envelopes of wave energy received by a receiver used in the system of FIG. 1, one of the waveforms being purely from a desired path between a transmitter and a receiver and the other two waveforms showing the effect of constructive and destructive interference caused by undesired path reflections added to the transmitted wave energy.

The burst 20 of sound wave energy is transmitted omnidirectionally or in a beam with some non-zero width and is reflected by any sound wave reflecting surface in the path of the transmitted sound waves. Here, it is desired to determine the range to a desired sound wave source, i.e., the speaker 18. Thus, here it is desired to measure the direct path range, $P_1$, between the speaker 18 and the receiving transducer 32, here an ultrasonic microphone, of receiver 30. However, because of other sound reflecting surfaces, such as surface 34, which may be in the path of the transmitted sound waves, indirect reflections are also received by the microphone 32 as along indirect path $P_2$. Thus, while the envelope of the desired received signal produced by the microphone 32 is shown in FIG. 3 by curve 40, the actual signal energy received by the microphone 32 may be as shown by curve 42, in the case of destructive interference between the desired direct path signal and the indirect path signal, or by curve 44, in the case of constructive interference between the desired direct path signal and the indirect path signal. It is noted that the amount of interference is a function of the additional time delay in the indirect path compared to the direct path, and that such time delay is a function of the distance of the unwanted reflecting surface from the sound wave source, i.e., speaker 18 and the receiver, i.e., microphone 32. It is also noted that the shape of the received reflection waveform is basically the same as the waveform received directly by the microphone, i.e., received by the microphone 32 along the direct path $P_1$, but with some attenuation and shift.

Thus, referring again to FIG. 3, it is noted that while the peak P of the envelope 40 of the uncorrupted direct path energy occurs at time $t_p$, interference from a nearby surface reflection may cause the peak of the combined waveform envelope to be at a different time of arrival $t'_p$, which may be early, as in envelope 42, or late, as in envelope 44. Use of the time $t'_p$ to determine the range to the sound wave source will result in an incorrect determination. More particularly, if the length of the direct path $P_1$ is R, and the total length of the undesired reflection path $P_2$ is R', where R'>R, if (R'−R) is less than $t_p C_S$, where $C_S$ is the speed of sound, the reflected waveform may begin to arrive at the receiver prior to time $t_p$, and therefore has the ability to influence the shape of the waveform envelope in the vicinity of P, which will alter the time of arrival, and hence range, measurement. Therefore, any object inside the ellipsoid of interference defined by $R' < R + t_p C_S$ has the potential to corrupt the accuracy of the time of arrival measurement. For a range measurement between a transmitter and receiver separated by a distance R, and using a time of arrival detector which detects a point P on the waveform which occurs at a time delayed by $t_p$ from the beginning of the waveform, the ellipsoid of interference will have a major axis of length $a = R + t_p C_S$ and a minor axis of length:

$$b = \sqrt{a^2 - R^2} = \sqrt{2 R t_p C_S + t_p^2 C_S^2}$$

In the prior art method of U.S. Pat. No. 5,280,457 referred to above, $t_p$ is the time from the beginning of the waveform envelope until it reaches a peak. For narrowband transducer elements such as small inexpensive piezoelectric ultrasonic transducers manufactured by Polaroid Corporation, Cambridge, Mass., and others, $t_p$ will typically be about 0.2 milliseconds or more. For a range measurement R=2 meters this results in a fairly fat ellipsoid of interference with a diameter at its widest point of about 0.5 meters for an R of 2 meters, a $t_p$ of 0. 2×10³¹ ³ seconds and $C_S$ of 330 meters per second (i.e., b is about 0.5 meters). This allows significant opportunity for extraneous objects to come near enough to the path between transmitter and receiver to corrupt the measurement.

The purpose of this invention is to provide a system with a much narrower ellipsoid of interference by detecting a point $P_o$ on the envelope which occurs earlier than the peak P.

Figure 4:
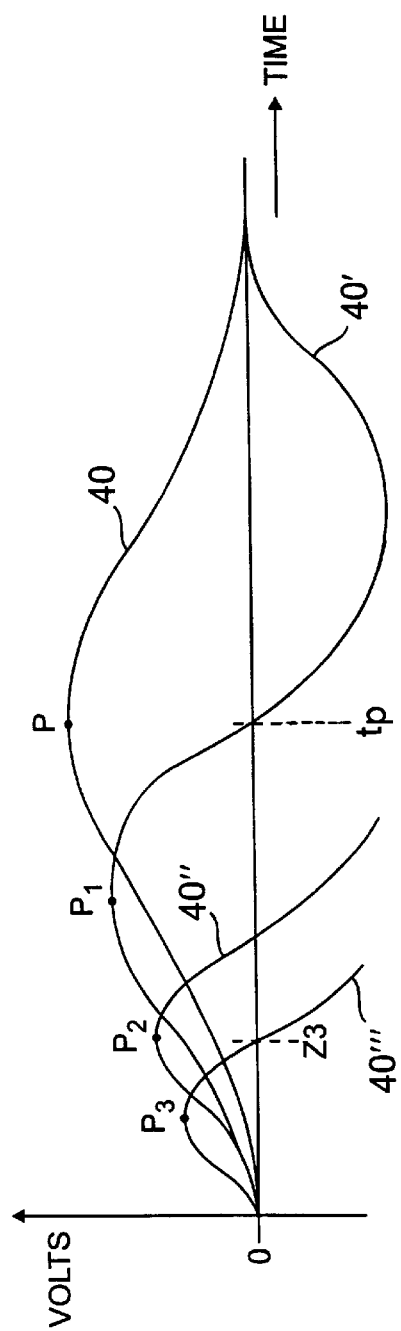
FIG. 4 are waveforms showing the envelope of the burst of wave energy detected by the receiver of the system of FIG. 1 and first, second and third derivatives of such envelope produced by such receiver.

Next, reference is made to FIG. 4 where the first, second and third derivatives 40', 40" and 40'", respectively, of the envelope 40 are shown. It is first noted that the first peak P1 in the detected envelope 40 occurs at the zero crossing following the first peak of the first derivative 40'. It is next noted that the first peak P1 in the first derivative 40' of the detected envelope 40 occurs at the zero crossing following the first peak of the second derivative 40". It is next noted that the first peak P2 in the second derivative 40" of the detected envelope 40 occurs at the zero crossing following the first peak of the third derivative 40'". It is next noted that the first derivative 40' first peak P1 occurs before the peak, or maximum, of the detected signal waveform 40. Likewise, the first peak P2 of the second derivative 40" occurs before the peak P1 in the first derivative. From this, it follows that detection of the first peak of the nth derivative of the envelope of the received waveform will occur earlier in time than detection of the first peak the (n−1)th derivative and use of the nth derivative zero crossing will reduce error in the time of arrival determination of the received burst caused by indirect path interference. Because the shape of the envelope never changed as the burst propagates through this medium, except for multiplication by an attenuation factor α, it follows that any derivative of the envelope is also simply multiplied by α. Therefore, the first peak of the nth (where n is a positive integer) derivative of the waveform will always occur. Likewise, the relative time between the beginning of the envelope and the first zero. Therefore the time of detection of any peak or zero crossing of any derivative of the envelope will be amplitude independent. Use of this first peak of equivalently the first zero crossing following the first peak of the n+1 derivative will enable detection of the time of arrival of the waveform with less effect from interference from undesired indirect path reflections.

Figure 5:
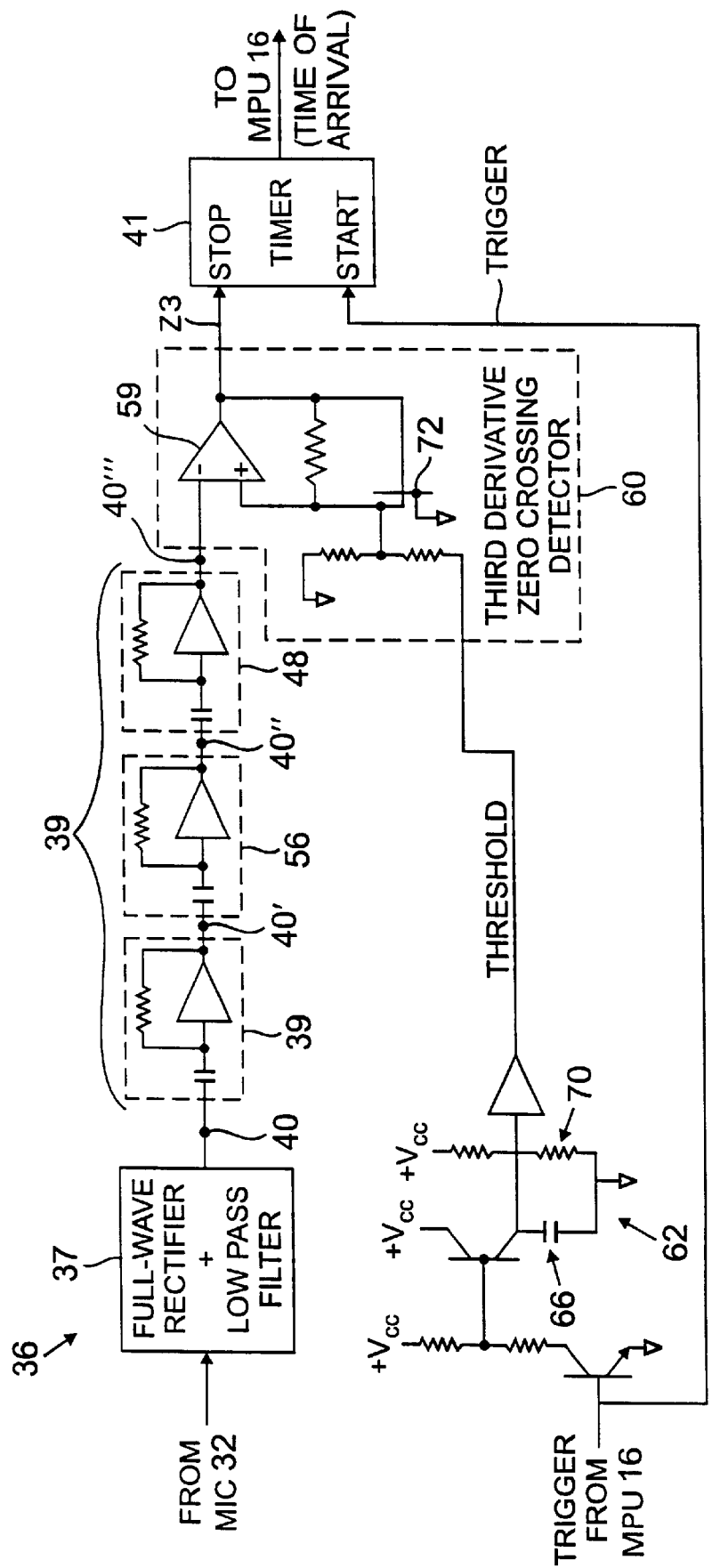
FIG. 5 is a block diagram of a network used in a receiver of the system of FIG. 1 to determine the time of arrival of a wave energy burst transmitted by a transmitter in such system.

The receiver 30 (FIG. 1) in addition to the microphone 32, includes a network 36 for detecting the envelope of the receiver burst (i.e., the "waveform") and then detecting a predetermined time rate of change characteristic of the waveform during the rising portion of such waveform. Here, the network 52, shown in FIG. 5, produces an output in response to a detection point $P_o$ on the detected envelope (i.e., the waveform 40) occurring prior to the peak P in the detected envelope, wherein the point of detection is unaffected by amplitude attenuation of the envelope or by any distortion of the envelope of after the defection point. More particularly, here the network 36 includes a differentiator network 39 and zero crossing detector 60 for producing an output in response to the zero crossing following the first peak of the nth derivative of the detected envelope, where n is an integer greater than one. Here, n is three and the zero crossing of the third derivative of the waveform (i.e., the zero crossing of waveform 40''') is detected. The network 36 includes a timer 41 responsive to the trigger signal produced by the MPU 16 and the third derivative zero crossing detector 60 output for determining the time of arrival of the burst. Also, the MPU 16 provided is responsive to the determined time of arrival, for determining the range of the sound wave source from the transmitter. Here, detection of the zero crossing, Z3, of the third derivative (i.e., n=3) of the waveform 40''' (FIG. 4) is used to stop the timer 41 initially started in response to the trigger pulse produced by the MPU 16 (FIG. 1). The MPU 16 determines, from such determined time of arrival, the range to the sound wave source, where range=$t_p C_s$.

More particularly, the receiver 36 (FIG. 5) includes an envelope detector 37, here a full wave rectifier and low pass filter, fed by the microphone 32, for detecting an envelope 40 of the burst, shown in FIG. 4. The produced envelope 40 is fed to the network 52, here including three serially connected differentiators 54, 56 and 58; a zero crossing detector 60; and the timer 41. Each one of the differentiators 54, 56, and 58 includes an operational amplifier with a capacitor fed to the input thereof and a resistor feedback. Also fed to the zero crossing detector 60 is an initial threshold setting circuit 62, which provides a suitable predetermined initial threshold voltage chosen by the designer or adjusted by the user based on ambient noise considerations. Thus, once the waveform exceeds a predetermined initial threshold level chosen to be above the level of ambient noise, the threshold changes to zero to detect when the third derivative 40''' passes through a now zero level threshold.

Figure 6B:
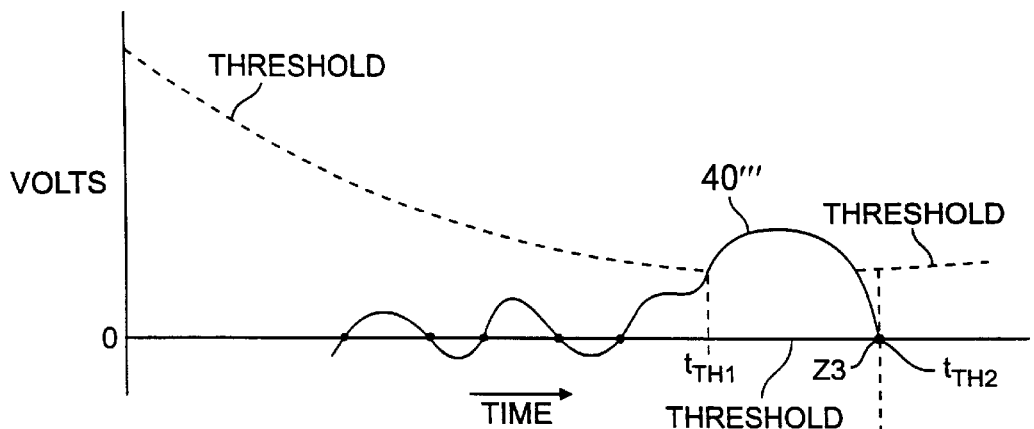
FIGS. 6A–6C are time histories of signals produced in the receiver of the system of FIG. 1.
Figure 6A:
Figure 6C:
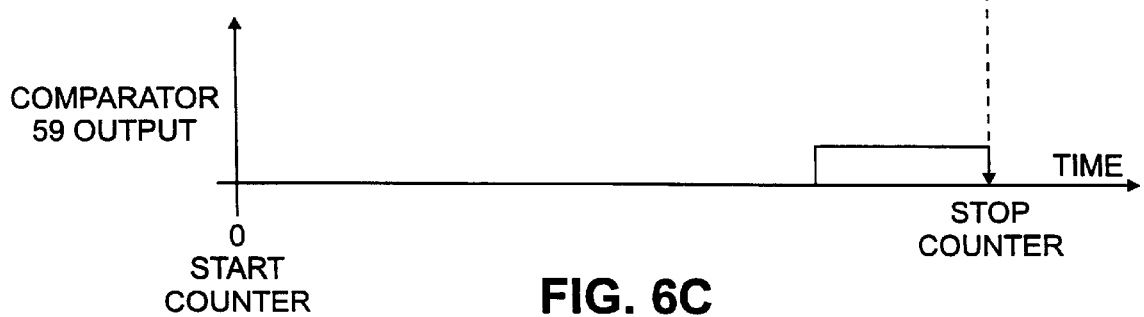

It is noted that the actual initial threshold level for the zero crossing detector 60 may be either a constant above the noise floor or a function of the timer 41 count which corresponds to range from the speaker 18 (FIG. 1). In the example illustrated, when the trigger signal (FIG. 6A) is produced by the MPU 16, a voltage is applied to the threshold circuit 62 to have a capacitor 66 therein store an initial pre-determined charge. The capacitor 66 stored charge then decays with a time constant selected with resistor 70 to represent the range effect thereby reducing the initial threshold level as a function of range, or transmission time, as shown in FIG. 6A. This a well known technique to improve the rejection of background noise during the earlier part of the ranging interval. Once the third derivative 40''' of the detected envelope 40 exceeds the threshold as established by the charge remaining on the capacitor 66, (i.e., at time $t_{TH1}$) the threshold level is forced to zero by field effect transistor (FET) switch 72 (i.e., at time $t_{TH2}$) to enable detection of the zero crossover point of the waveform. Thus, at time $t_{Z3}$=$t_{TH2}$, the zero crossing Z3 of the third derivative is detected. When the third derivative produced by differentiator 58 (i.e., the waveform 40''') exceeds the threshold at time $t_{TH1}$ the output of comparator 59 goes high (FIG. 6C). When the third derivative then crosses zero (i.e., at time $t_{Z3}$) the output of the comparator 59 goes low (FIG. 6C). The falling edge of the comparator output labelled Z3 is used to stop timer 41 (FIG. 5), such timer 41 having been started by the trigger pulse produced by MPU 16. Thus, the contents of timer 41 represents the time of arrival of the detection point of the received waveform 40. It is noted then that the comparator 59 output signal Z3 (FIG. 6C) produces a pulse to indicate detection of the time of arrival of the point P in the sound burst.

Figure 7:
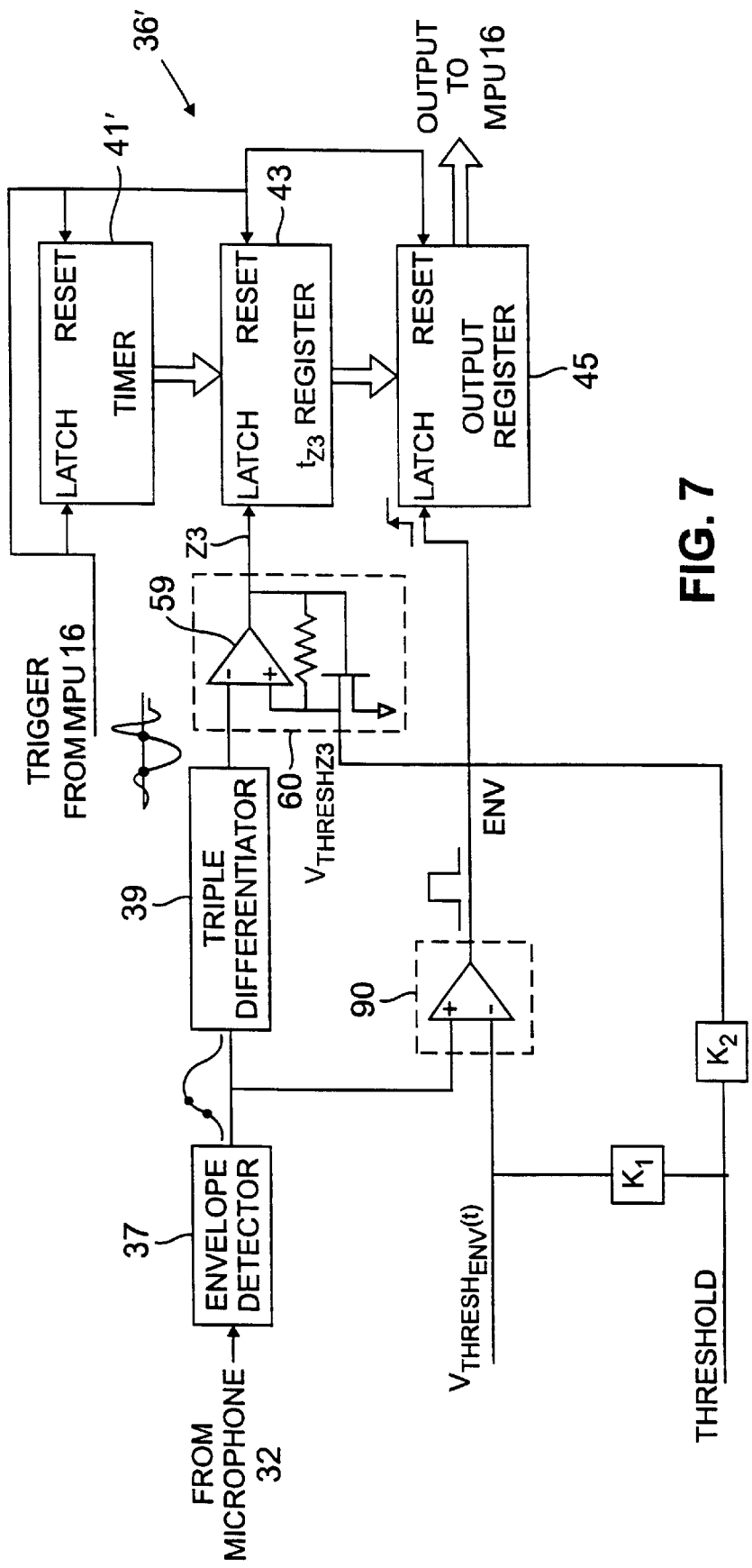
FIGS. 7 and 8 are block diagrams of other networks adapted for use in the receiver section of the system of FIG. 1 to determine the time of arrival of a wave energy burst transmitted by a transmitter in such system, with a lower false alarm rate.

Referring to FIG. 7, the network 36' shown illustrates one method to prevent false alarm Z3 signals, i.e., those generated by noises other than valid bursts from the transmits from being processed, i.e., used to compute the time of arrival. It is first noted that like elements in the receiver 36 and 36' have the same numerical designation. It is next noted that a comparator 90 is provided. The comparator 90 has one input fed by the output of the envelope detector 37 and the other input fed by the THRESHOLD signal produced by the threshold setting circuit 62 (FIG. 5) after passing through a gain adjusting network $K_1$, where $K_1$ may be greater or less than one. (Here, the output of the gain adjusting network is designated as $Vthresh_{ENV}$). The threshold signal fed to the zero derivative crossing detector 60 (FIG. 7) is here designated as $Vthresh_{Z3}$ and is provided by passing the THRESHOLD signal produced by the threshold setting circuit 62 (FIG. 5) through a gain adjusting network $K_2$, where here $K_2$ may be one, greater than one, or less than one.

Here, when a pulse on line Z3 is produced by the comparator 59 (FIG. 6C), it does not stop the timer 41 (FIG. 5), but merely copies the count value in a timer 41' into a $t_{Z3}$ register 43. This may happen once or even several times during a range measurement cycle in response to say, human or machine produced noises in the workspace. When the true pulse arrives, there will first be a pulse produced by comparator 59 (FIG. 7) when a third derivative zero-cross, Z3, is detected, which replaces the previous erroneous value in the $t_{Z3}$ register 43 with a true accurate value. Shortly thereafter an ENV signal will be detected by comparator 90 causing this true value to be copied to an output register 45 and made available to the MPU 16 for processing. If the relative threshold values of $Vthresh_{Z3}$ fed to the threshold detector 60 and $Vthresh_{ENV}$ fed to detector 90 have been correctly set, there will always be a detection of the zero crossing of the third derivative, Z3, by comparator 59 on the rising edge of a true waveform envelope with sufficient amplitude to trigger the ENV detection (i.e., latch the output of the $t_{Z3}$ register 43 contents into output register 45, so an old false value of $t_{Z3}$ will never be latched through to the output register 45. If this adjustment can not be conveniently accomplished with sufficient certainty, it may be desirable to also send to the MPU 16 the timer 41' value corresponding to the time $t_{ENV}$ when the signal on line ENV arrived and caused the $t_{Z3}$ value to be latched into output register 45. The MPU 16 may then compare those values to make sure that third derivative zero crossing detection, Z3, (i.e., the time $t_{Z3}$) occurred within an appropriate short time window prior to $t_{ENV}$.

Thus, an additional detector 90 is provided for the envelope waveform 40 which indicates the detection above some appropriate threshold of the received waveform 40. Thus, while false zero crossings may be detected by the third derivative 40''' zero crossing threshold detector 60, a third derivative zero crossing detection $t_{z3}$ is made available for output to MPU 16 only if the presence of the received waveform 40 is detected within a short predetermined time window after this zero crossing of the third derivative 40''' is detected. Thus, the presence of the waveform 40 is detected by the detector 90 and hence detection of waveform 40 acts as a validation, or confirmation that the previously defected time of arrival (TOA) is not a false alarm. The signal detected by the detector 90 has had fewer differentiator stages and therefore has less amplification of high-frequency noise relative to the signal, than has the third derivative signal detected by comparator 59. Therefore, if the threshold level for detector 90 is set just below the expected level of valid signals, it will have a much lower false alarm rate than detector 59, and can be used to prevent false alarms from detector 59 from prematurely stopping timer 41. However, the actual timer count value transmitted after a validation from detector 90 should be the instant of the falling edge from detector 59 because it is more accurate.

Figure 8:
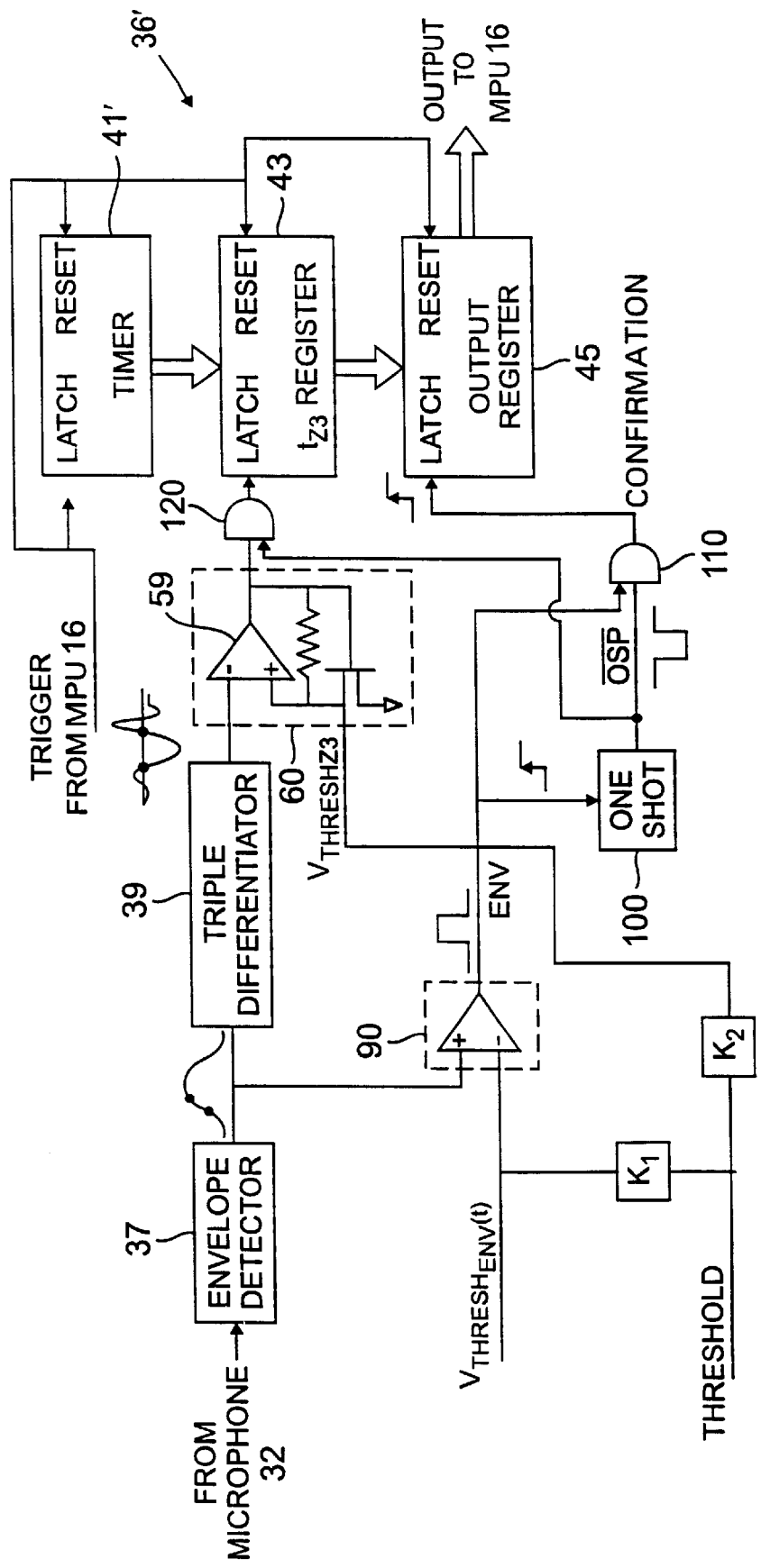

Other embodiments are within the spirit and scope of the appended claims. For example the pulse produced by comparator 59 (FIG. 7) and the ENV signal may be polled directly by an MPU 16, which stores the time values and uses software to choose the last $t_{Z3}$ prior to $t_{ENV}$ with no need for any external counters or latch registers. The method illustrated by the circuit in FIG. 7 allows a system to obtain the accuracy benefit of the inventive method, while at the same time enjoying the low false alarm rate of the prior art methods (i.e. higher signal to noise ratio inherent in the undifferentiated envelope signal). Other means can be provided for confirming the presence of a true burst of signal from transmitting source 12 which provides an even higher noise rejection capability while still basing the time of arrival determination on the very early detection point $P_o$ with its narrower ellipsoidal interference region. For example, FIG. 8 sows an embellishment of the network in FIG. 7 in which confirmation of the arrival of a valid burst requires the envelope waveform 40 to not only cross above the threshold of detector 90, but also to remain above that threshold for a predetermined period of time set by one-shot multivibrator 100. Only after the one-shot pulse $\overline{OSP}$ expires back to a high level will AND gate 110 deliver a CONFIRMATION pulse to latch $t_{23}$ into the output register if and only if the output of detector 90 is still high. The $\overline{OSP}$ signal is also used by AND gate 120 to block any additional Z3 detection pulses from erroneously update the $t_{23}$ register after time $t_{ENV}$.

While the detailed system described above makes use of analog differentiators to identify a repeatable detection point on the rising edge of the waveform envelope, any method which can repeatable identify a deletion point P prior to the peak P based on characteristics of the shape of the rising edge that are invariant under scale factor changes is considered. For example, the waveform envelope (or the waveform itself) may be sampled periodically by an A/D converter, with results being saved into a ring buffer until stopped by a pulse detection signal. The data in the ring buffer can then be analyzed using autocorrelation or curve fitting techniques to try to identify a point on the rising edge satisfying certain time-rate-of-change characteristics for preceding data samples, which would not be altered by a global attenuation of the waveform.

What is claimed is:

1. A system for determining a time of arrival of a waveform having a certain shape including a rising portion and terminating portion, such waveform possibly being attenuated as such waveform passes through a medium, such medium maintaining the shape of the waveform, such system comprising:

a detector for detecting a point corresponding to a zero crossing of the nth derivative (n>1) of the waveform on the rising portion of the waveform, such point occurring at a fixed time delay after the beginning of the waveform which delay is unaffected by any attenuation of the waveform or by any alteration of the portion of the waveform after the point; and a timer, responsive to the detected point on the waveform, for determining the time of arrival.

2. A system for determining range between a transmitter and a receiver, such system comprising:

(a) a transmitter for transmitting a burst of wave energy in response to a trigger signal;

(b) a receiver for determining a time of arrival of the burst, and from such determined time of arrival, the distance traversed by the wave burst, such receiver comprising:

(i) an analog envelope detector for detecting an envelope of the burst;

(ii) a network for producing an output in response to a point corresponding to a zero crossing of the nth derivative (n>1) of the envelope on the detected envelope occurring prior to a peak in the detected envelope such point occurring at a fixed time from the beginning of he burst regardless of any amplitude alteration of the burst; and (iii) a timer, responsive to the trigger signal and the network output for determining the time of arrival of the burst; and (c) a processor, for determining the distance from the determined time of arrival.

3. The system recited in claim 2 wherein the receiver includes a burst validation means for confirming reception of the burst and wherein the time of arrival of the point is stored until after such burst confirmation has been detected.

4. The system recited in claim 3 wherein the burst validation means includes a means of measuring the extent of the burst.

5. A system for determining distance traversed by a burst of wave energy, such system comprising:

(a) a transmitter for transmitting a burst of wave energy in response to a trigger signal;

(b) a receiver for determining a time of arrival of the burst, such receiver comprising:

(i) an analog envelope detector for detecting an envelope of the burst; and (ii) a network for producing an output in response to a zero crossing of the nth derivative of the detected envelope, where n is an integer greater than one.

6. The system recited in claim 3 wherein the burst validation means includes a burst threshold detector for determining detection by the receiver of a burst with peak amplitude exceeding a predetermined threshold.

7. The system recited in claim 5 wherein the first peak of the (n−1)th derivative of the envelope is detected by detecting the zero-cross immediately following the first peak of the nth derivative.

8. The system recited in claim 5 wherein the burst of wave energy comprises acoustic wave energy.

9. The system recited in claim 5 wherein the distance traversed by the burst corresponds to a round trip distance from the transmitter to a reflecting object and back to the receiver located spatially coincident with the transmitter.

10. A method for determining a time of arrival of a waveform having a certain shape including a rising portion and terminating portion, such waveform possibly being attenuated as such waveform passes through a medium, such medium maintaining the shape of the waveform, such method comprising:

detecting a point corresponding to a zero crossing of the nth derivative (n>1) of the waveform on the rising portion of the waveform such point occurring at a fixed time delay after the beginning of the waveform which delay is unaffected by any attenuation of the waveform or by any alteration of the portion of the waveform after the point; and determining the time of arrival from the time of detection of the point on the waveform.

11. A system for determining a time of arrival of an ultrasonic sound burst, comprising:

a microphone for receiving the ultrasonic burst;

an analog envelope detector fed by the microphone for detecting an envelope of the ultrasonic burst received by the microphone;

a differentiator network for producing a signal representative of the nth derivative of the detected envelope, where n is an integer greater than one;

a comparator fed by a threshold signal and the signal produced by the differentiator network.

12. A system for generating a pulse at a time of arrival of a waveform having a certain shape including a rising portion and terminating portion, such waveform possibly being attenuated as such waveform passes through a medium, such medium maintaining the shape of the waveform, such system comprising:

a detector for detecting a point corresponding to a zero crossing of the nth derivative (n>1) of the waveform on the rising portion of the waveform, such point occurring at a fixed time delay after the beginning of the waveform, such delay being unaffected by any attenuation of he waveform or by any alteration of the portion of the waveform after the point.

13. A system for determining time of arrival of a wave energy source, such system comprising:

(a) a transmitter for transmitting a burst of pulses of wave energy in response to a trigger signal; and (b) a receiver for determining a time of arrival of the burst, and from such determined time of arrival, the distance traversed by the wave burst, such receiver comprising:

(i) an analog envelope detector for detecting an envelope of the burst;

(ii) a network for producing an output in response to a point on the detected envelope corresponding to a zero crossing of the nth derivative (n>1) of the detected envelope occurring prior to a peak in the detected envelope; and (iii) a timer, responsive to the trigger signal and the network output for determining the time of arrival of the burst.

14. A system for determining range to a wave energy source, such system comprising:

(a) a transmitter for transmitting a burst of pulses of wave energy in response to a trigger signal;

(b) a receiver for determining a time of arrival of reflections of such energy by the wave energy source, and from such determined time of arrival, the range to the wave energy source, such receiver comprising:

(i) an analog envelope detector for detecting an envelope of the burst;

(ii) a differentiator network for producing an output in response to the nth derivative of the detected envelope, where n is an integer greater than one.

15. A system for determining a time of arrival of a sound burst, comprising:

a microphone for receiving the sound burst;

an analog envelope detector fed by the microphone for detecting an envelope of the sound burst received by the microphone;

a differentiator network for producing a signal representative of the nth derivative of the detected envelope, where n is an integer greater than one;

a comparator fed by a threshold signal and the signal produced by the differentiator network.

16. A system for determining a time of arrival of a waveform having a certain shape including a rising portion and terminating portion, such waveform possibly being attenuated as such waveform passes through a medium, such medium maintaining the shape of the waveform, such system comprising:

a non-automatically gain controlled receiver, comprising:

a detector for detecting a point on the rising portion of the waveform corresponding to a zero crossing of the nth derivative (n>1) of the waveform; and a timer, responsive to the detected point on the waveform, for determining the time of arrival.

* * * * *